Figure 1:
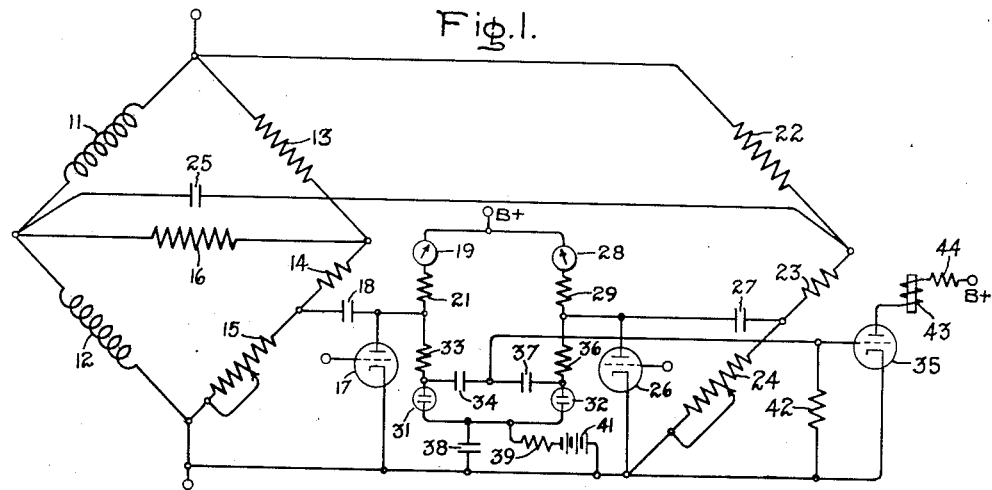

Oct. 23, 1956 — W. O. HANSEN — 2,768,347
VACUUM TUBE BALANCING NETWORK
Filed April 24, 1953 — 2 Sheets-Sheet 1

Inventor:
Wilbur O. Hansen,
by Paul A. Frank
His Attorney.

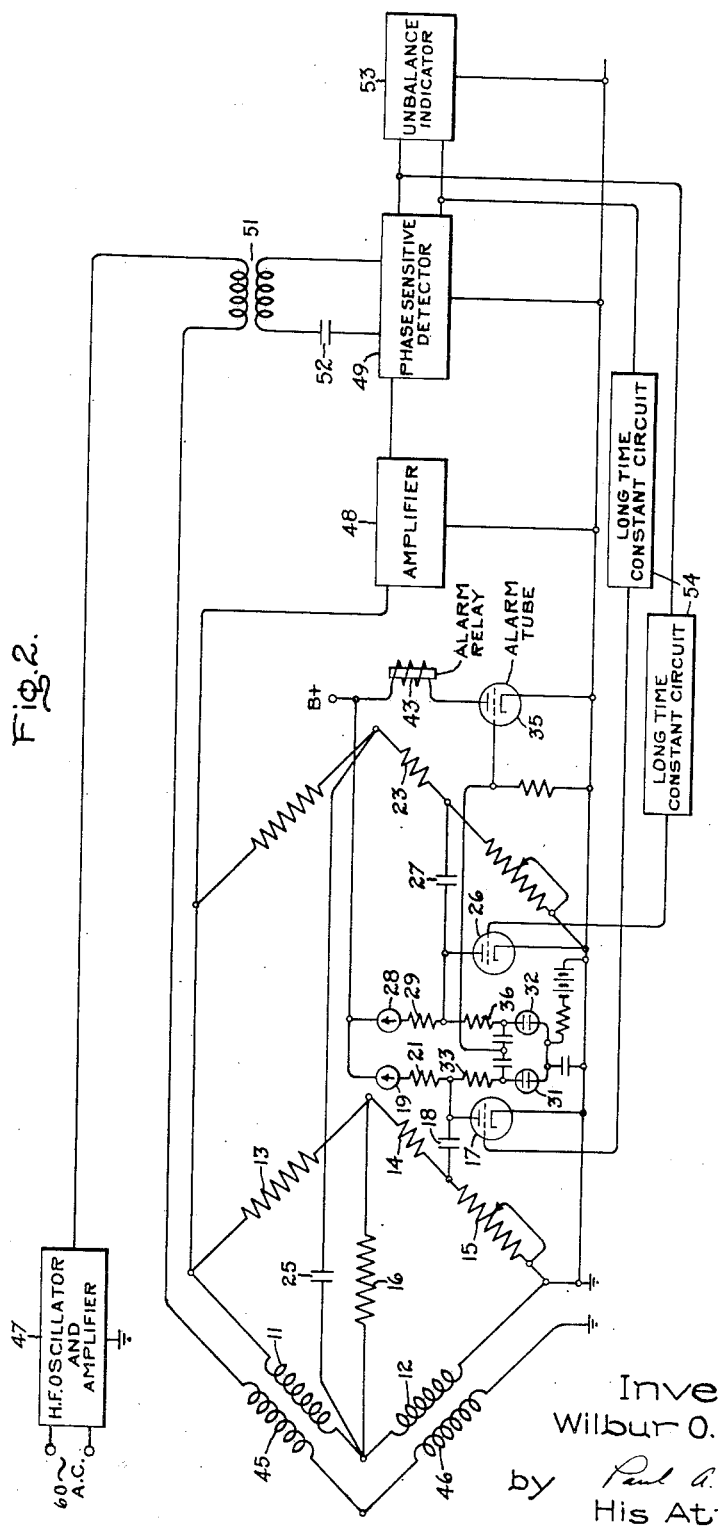

United States Patent Office 2,768,347
Patented Oct. 23, 1956

2,768,347

VACUUM TUBE BALANCING NETWORK

Wilbur O. Hansen, Schenectady, N. Y., assignor to General Electric Company, a corporation of New York Application April 24, 1953, Serial No. 351,012

10 Claims. (Cl. 324—41)

The present invention relates to a vacuum tube balancing network.

More particularly, the invention relates to a double bridge vacuum tube balancing network for use on metal detector systems and the like, for automatically maintaining the sensing element portion of such systems in a properly balanced condition.

Automatically operating vacuum tube balancing networks have been available in the art for a large number of years. One such network for use with a metal detecting system, is disclosed in U. S. Patent 2,489,920, P. C. Michel inventor, issued November 29, 1949. The known networks heretofore available in the art, such as the balancing network mentioned above, have not been entirely satisfactory, however, due to the complexity of design of such networks, and the fact that they were too expensive to build. Additionally, the known networks of this type are not capable of maintaining a proper balance despite the existence of a large number of conditions tending to create an unbalance in the network, and in spite of the existence of very severe unbalancing conditions.

It is, therefore, one object of the present invention to provide a new and improved vacuum tube balancing network which is capable of automatically retaining its balanced condition over a long period of time despite such effects as aging of component parts, changes in ambient temperature, etc.

Another object of the invention is to provide a vacuum tube balancing network which is capable of maintaining a balanced condition despite the existence of a large number of factors tending to bring about an unbalance of the network.

Still another object of the invention is to provide a balancing network which is capable of maintaining proper balance despite the existence of unbalancing conditions of varying degrees of severity.

A further object of the invention is to provide a vacuum tube balancing network which is simple in design, and requires fewer components than previous networks of the same general type.

A still further object of the invention is to provide a vacuum tube balancing network incorporating all of the above set forth characteristics, and which is comparatively inexpensive to manufacture.

In practicing the invention, a vacuum tube balancing network is provided which comprises a first bridge circuit having an impedance in each of the arms thereof, a resistor connected across a pair of diagonally opposite terminals of the bridge circuit, and an electron discharge tube connected in parallel with at least a portion of the impedance in one arm of the bridge circuit for shunting the same. The balancing network further includes a second bridge circuit formed by two adjacent arms of the said first bridge circuit, and further comprised of two additional adjacent arms each including an impedance. An electron discharge tube is connected in parallel with at least a portion of the impedance in one of the additional arms, and a reactance is connected across a pair of diagonally opposite terminals of the second bridge circuit thus formed.

Figure 3:
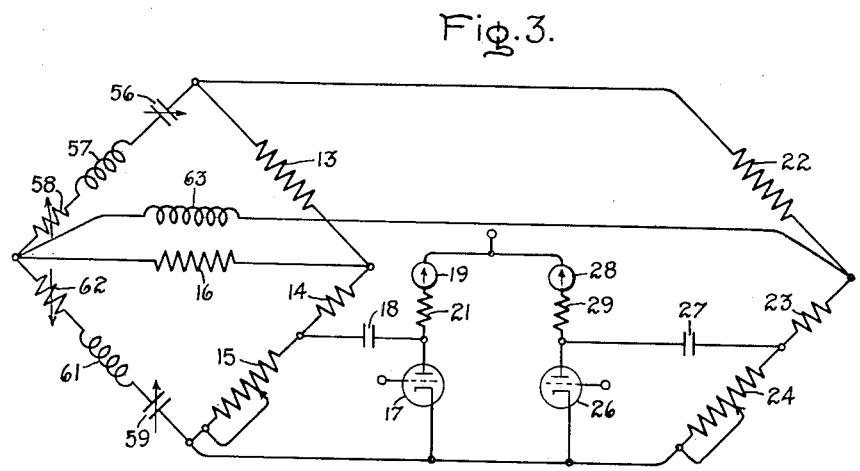

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

Fig. 1 is a schematic circuit diagram of the new and improved vacuum tube balancing network constructed in accordance with the invention; Fig. 2 is a combined circuit diagram and functional block diagram of a metal detecting system incorporating the new and improved vacuum tube balancing network illustrated in Fig. 1, as a part thereof; and Fig. 3 is a schematic circuit diagram of a second form of the balancing network constructed in accordance with the invention.

The vacuum tube balancing network illustrated in Fig. 1 comprises a balanced double bridge arrangement which includes a first bridge circuit formed by an inductance 11 and an inductance 12 both of which may comprise the windings of an inductive sensing coil arrangement, and which are connected together to form two adjacent arms of the first bridge circuit. A fixed resistor 13 together with a small fixed resistor 14 and adjustable resistor 15 form the remaining two adjacent arms of the first bridge circuit, and resistor 16 is connected across the diagonally opposite terminals of the bridge circuit formed by the juncture of the inductances 11 and 12, and by the juncture of the resistors 13 and 14. A grid controlled electron discharge tube 17 is connected with its discharge path in parallel with at least a portion of the adjustable resistor 15 through a coupling capacitor 18, and has the plate electrode thereof connected to a source of positive direct current supply potential B+ through a plate load resistor 21 and a meter 19. The cathode electrode of electron discharge tube 17 is connected to the terminal of the first bridge circuit formed by the junction of inductance 12, and resistor 15.

The balanced double bridge arrangement is further comprised of a second bridge circuit that is formed by the two adjacent inductance arms 11 and 12 of the first bridge circuit, and further includes two additional adjacent arms comprised of fixed resistor 22, fixed resistor 23 and adjustable resistor 24 connected together in series electric circuit relationship. A reactance, preferably a capacitor 25, is connected across the pair of diagonally opposite terminals of the second bridge circuit, formed by the juncture of the inductances 11 and 12, and the juncture of resistor 22 with the resistor 23. A grid controlled electron discharge tube 26 is connected with its discharge path in parallel with at least a portion of the adjustable resistor 24 through a coupling capacitor 27 with the plate electrode of the electron discharge tube being connected to a source of positive direct current potential through a plate load resistor 29, and a meter 28, and with the cathode electrode of the electron discharge tube 26 being connected to the terminal of the second bridge circuit formed by the juncture of inductance 12 with adjustable resistor 24. With electron discharge tubes 17 and 26 connected in the above-described manner, the electron discharge tubes 17 and 26 are in effect high frequency resistors in parallel with their respective adjustable resistors 15 and 24 and the magnitude of the resistance can be varied by changing the amount of direct current voltage applied to the control grids. Since the D.-C. plate current of the tubes 17 and 26, indicated by the meters 19 and 28, are also controlled by the control grid voltages, these currents can be used to indicate the effective high frequency resistance of the electron discharge devices.

In operation, electric signals are induced in each of the inductances 11 and 12 in such a manner that they are 180 degrees out-of-phase and the double bridge circuit arrangement initially balanced by adjustment of the value of the resistors 15 and 24 so that the amount of initial current flow through electron discharge tubes 17 and 26 is half way between maximum and minimum usable values. Thereafter, should the environmental conditions in the neighborhood of either inductance 11 or 12, or the characteristics of the other bridge components change so as to affect the voltage relationships existing across the bridge, the network becomes unbalanced. If the unbalance is due to a shift in phase of the voltage induced in either of the inductances, this shift in phase is detected by a phase sensitive detector (not shown) which feeds back a control signal to the control grid of electron discharge tube 26 to cause its effective high frequency resistance to increase or decrease, dependent upon the direction of the unbalance due to the phase shift. The change in resistance of electron discharge tube 26 then affects the high frequency current flowing through capacitor 25 to either increase or decrease the current coupled therethrough to thereby compensate for the original change in phase. Should the change in voltage relationships across the bridge be due to a change in the amplitude of the voltage induced in inductances 11 and 12, the change in amplitude is detected by the phase sensitive detector which derives a control signal that is fed back to the control grid of electron discharge tube 17 to cause the same to increase or decrease its effective high frequency resistance dependent upon the direction of change in amplitude of the voltage induced in the inductances. The change in high frequency resistance of electron discharge tube 17 then changes the current flowing through resistor 16 to increase or decrease the same, and thereby compensate for the original change in the amplitude of the voltage induced in inductances 11 and 12. Hence, upon the conditions affecting the voltage induced in inductances 11 and 12 bringing about an unbalance in the double bridge circuit shown, the unbalance is detected by a phase sensitive detector (not shown) which produces a control signal that is fed back to the electron discharge tubes 17 or 26 to control the action of the same so as to compensate for the original change in the balance of network.

Due to the fact that there is a limit to the amount of current that may be conducted through either of the electron discharge tubes 17 or 26, and therefore the effective high frequency resistance thereof, the balancing network comprising the present invention must be operated within some restricted range. Hence, should some outside factor severely influence the operation of the network so as to cause an extreme unbalance and result in causing electron tubes 17 and 26 either to approach a saturated current condition, or to approach the cutoff point, alarm circuit means are provided to indicate such condition to an operator of the circuit so that he can take steps to rectify the condition. This alarm circuit preferably comprises a pair of two electrode, gas discharge tubes 31 and 32. The gas discharge tube 31 has one electrode thereof connected through a high value isolating resistor 33 to the plate electrode of the grid controlled electron discharge tube 17. The other electrode of tube 31 is connected through resistor 39 to a reference source of potential 41. The gas discharge tube 32 likewise has one electrode thereof connected through resistor 36 to the plate electrode of grid controlled electron discharge tube 26 and has its other electrode connected through the same resistor 39 to the same reference potential 41. By this arrangement, a direct current bias potential may be applied to corresponding electrodes of each of the gas discharge tubes 31 and 32 from plate potential, of electron tubes 17 and 26, and a second biasing potential may be applied to the remaining electrode from the reference source of potential 41. By proper adjustment of the values of the bias applied through resistors 33 and 36 to one electrode of each of the gas discharge tubes, and through the resistor 39 to the remaining electrodes, the points at which the gas discharge tubes become conductive can be controlled so that they are rendered conductive upon plate current flow through the resistors 21 and 29 rising above a first predetermined value, or dropping below a second predetermined value. Hence, upon the plate current of either of the grid controlled electron discharge tubes 17 and 26, becoming excessively high or low as they approach saturation or cutoff, the drop or increase in plate potential thereof (whichever the case might be) is coupled through the resistors 33 or 36 to the gas discharge tubes 31 and 32 to render the same conductive. Upon either tube 31 or 32 becoming conductive a change in potentials will occur at the junction of the tube and its corresponding resistor 33 or 36 and in such a direction as to approach the reference potential 41. This step potential is coupled through either capacitor 34 or 37 to the control grid of electron discharge relay tube 35. The plate electrode of tube 35 is connected through the excitation winding 43 and through resistor 44 to a source of an on-off relay B+. The value of resistor 44 is so chosen as to allow the relay to be set manually by any suitable means to a closed or energized conditions with zero potential on the control grid of tube 35. If the step voltage at the junction of gas tube 32 and resistor 36 or gas tube 31 and resistor 33 is negative it will cause the current in tube 35 to decrease thereby causing the relay to open up, resulting in the production of an alarm signal of some sort whether it be a light, audible signal or otherwise, to indicate that an excessive unbalancing condition does or will soon exist. If however the step voltage mentioned previously is positive, the relay current increases with no resulting alarm action. However, the potential at the junction of gas tubes 31, 32 and their respective resistors 33 and 36 does go positive, sufficient current is drawn through resistor 39 to cause the potential of the junction of gas tubes 31 and 32 and resistor 39 to decrease until the gas tube extinguishes, at which time the potential at the junction of the gas tube and its respective resistor 33 or 36 to become more negative. The process will then repeat itself to produce a relaxation type oscillation. Capacitor 38 is connected across the series combination of resistor 39 and bias source 41 to give a sufficiently long period of this relaxation oscillation so that the negative swings in potential when coupled through capacitors 34 or 37 to the control grid of electron tube 35 will cause the relay to open and thereby give an alarm. In this manner both excessively low or high plate potentials of tubes 17 or 26 will give rise to a negative trigger voltage to the grid of tube 35 thereby giving an alarm to indicate the presence of an excessively high unbalance in the network.

An electronic metal detecting apparatus incorporating the novel vacuum tube balancing network as a part thereof, is illustrated in Fig. 2 of the drawings, the metal detecting apparatus comprises a sensing head which includes a detecting coil arrangement having a pair of primary windings 45 and 46. The primary windings 45 and 46 are coupled across and energized by a source of high frequency oscillations 47 that is in turn energized by a source of standard 60 cycle alternating current energy, and are inductively coupled with the secondary windings 11 and 12 thereof which comprise two adjacent arms of a vacuum tube balancing network identical to that described in connection with Fig. 1. As the construction and operation of the vacuum tube balancing network shown in Fig. 2 is the same as that described with relation to Fig. 1, a further description of the network is believed unnecessary.

An output signal produced across the network by reason of an unbalancing occurring therein, is coupled to the input of an amplifier 48 having the output thereof connected to the input of the phase sensitive detector 49. The phase sensitive detector 49 may be similar in construction to the phase detector 19 described in the above-identified Michel Patent 2,489,920, and includes a pair of grid-controlled electron discharge devices (not shown). The control grids of the electron discharge devices in the phase sensitive detector are supplied with voltages from the secondary winding of a transformer 51 that has the primary winding thereof connected in series circuit relationship with the primary windings 45 and 46 of the detecting coil arrangement and a source of high frequency oscillation 47. The secondary winding of transformer 51 is directly connected to the control grid of one of the electron discharge devices of the detector, and is coupled through a phase shifting capacitor 52 to the control grid of the remaining electron discharge device of the detector. Therefore, one of the electron discharge devices in the phase sensitive detector is suppled with an excitation reference voltage from the high frequency oscillator 47 which has substantially the same phase as the signal applied across the primary windings 45 and 46 of detecting coil arrangement, while the control grid of the remaining electron discharge device in the phase sensitive detector is supplied with an excitation reference voltage which is shifted in phase substantially 90° with respect to the potential applied to the exciting windings 45 and 46 by the high frequency oscillator. By this arrangement, the phase-sensitive detector 49 serves to develop two direct current output signals one of which is proportional to the signal in phase and one proportional to the signal that is 90° out of phase with the electric signal used to excite the sensing coil arrangement 45 and 46. One or both of these direct current outputs are applied to an unbalance indicator 53, coupled to the output of phase sensitive detector 49. The outputs of phase sensitive detector 49 are also coupled through a pair of long time response coupling circuits 54 to the control grids of the respective electron discharge tubes 17 and 26.

The detecting coil arrangement formed by windings 45, 46, 11 and 12 is adapted to be disposed adjacent a conveyor for inspecting materials for metallic particles whether they be magnetic or non-magnetic in nature. The particular reaction or type of influence that a foreign particle will have on an alternating magnetic inspection field, is a function of the conductivity, permeability and size of the particle and of the frequency of the alternating magnetic field. If the nature of the particle is such that it affects primarily the magnitude of the signal voltage induced in the secondary windings 11 and 12, and has little or no effect on the phase relation of the induced signal, then, the magnitude of the voltage induced in windings 11 and 12 is changed. Hence, the balanced condition of the double bridge network is disturbed, and an unbalance signal is produced across the output terminals of the bridge network. This unbalance signal is fed to the input of amplifier 48 which serves to amplify the same, and to supply it to phase sensitive detector 49. As the unbalance signal is in phase with the current flowing in the primary windings 45 and 46 of the detecting coil arrangement, it will likewise be in phase with the reference signal coupled across the transformer 51 and fed directly to the control grid of one of the electron discharge tubes of the phase sensitive detector. This particular electron discharge tube will, therefore, be rendered conductive and will produce in the output thereof an output signal having a magnitude indicative of the unbalance created by the magnetic particle, and produces an indication in the unbalance indicator 53.

If the nature of the particle appearing in the material under inspection is such that a voltage is induced in the secondary windings 11 and 12 of the detecting coil arrangement which is out of phase with respect to the voltage applied to the primary windings 45 and 46, this out of phase voltage likewise causes an unbalance of the double bridge arrangement to thereby cause the same to produce an unbalance signal. The unbalance signal is then amplified in amplifier 48, and fed to the input of phase sensitive detector 49. As the unbalance signal is out of phase with the reference electric signal applied to transformer 51, it is substantially in phase with the signal coupled through phase shifting capacitor 52, so that it causes the particular grid control electron discharge device of phase sensitive detector 49 that has the control grid thereof coupled to the secondary winding of transformer 51 through phase shifting capacitor 52, to be rendered conductive, and to produce an output signal indicative of the size of the non-magnetic particle detected by the detecting coil arrangement. This output signal is then fed to the input of unbalance indicator 53.

If the condition of unbalance of the double bridge arrangement is only transitory in nature such as would be due to the occurrence of a metallic particle entering the inspection area of the detecting coil arrangement, the output signal produced in the output of phase sensitive detector 49 produces a response in unbalance indicator 53, and is applied to the long time response coupling circuit 54. A transitory signal does not pass through the long time response coupling circuit 54, however, and hence will not be applied to the control grid of either of electron discharge tubes 17 or 26. However, if the unbalance signal appearing across the output of the double bridge arrangement continues over a long period of time due to some defect or environmental condition that permamentaly affects the balance of the bridge, such relatively continuous unbalance signal passes through the long response time coupling circuit 54, and is applied to the control grid of either the electron discharge tube 17, or electron discharge tube 26, depending upon the nature of the unbalance. In either event, the electron discharge tubes operate to restore the bridge circuit to its balanced condition. From this description, it can be readily appreciated that the novel vacuum tube double bridge balancing network provided by the invention has substantial utility in metal detector apparatus, as well as in other types of monitoring systems.

A modified form of the vacuum tube balancing network is disclosed in Fig. 3 of the drawings, and is very similar to the arrangement illustrated in Fig. 1; but differs therefrom, however, in that it utilizes a different type of sensing element than the circuit arrangement shown in Fig. 1. In place of utilizing a variable inductance sensing element in each of two adjacent arms of the double bridge arrangement, the network shown in Fig. 3 includes a variable capacitor 56 connected in series circuit relationship with a small fixed inductor 57, and an adjustable resistor 58 to form one arm, and a variable capacitor 59 together with a small inductor 61 and an adjustable resistor 62 to form a second adjacent arm. An inductance 63 is connected between the diagonally opposite terminals of the bridge circuit formed by the juncture of resistors 58 and 62 and the juncture of resistors 13 and 14 in place of the capacitor 25 used in the arrangement shown in Fig. 1. Each of the capacitors 56 and 59 are adapted to be acted upon by some phenomena desired to be measured so as to vary the capacitance thereof, and thereby effect the balance of the bridge circuit shown in Fig. 3. In light of the fact that the remainder of the bridge circuit of Fig. 3 is identical in construction to that shown in Fig. 1, a further description of the other elements of the circuit arrangement is believed to be unnecessary.

In operation, the circuit of Fig. 3 is similar to that in Fig. 1 with the notable exception that in place of increasing or decreasing the lagging voltage across the reactance 63 to thereby maintain the voltage induced in the bridge in some predetermined phase relation with respect to the reference voltage applied thereacross, the lagging voltage induced in the bridge is either increased or decreased to compensate for changes in the leading voltage induced in the sensing capacitors 56 or 59 of the bridge. In this manner, phase changes in either of the capacitive bridge arms may be compensated for by controlling the conductance of the electron discharge tube 26 so as to retain the bridge circuit in balance with regard to phase. Similarly, the amplitudes of the voltage induced in each of the bridge arms can be maintained in balance by controlling the conductance of the electron discharge tube 17. It is therefore clearly understandable that the operation of the circuit of Fig. 3 is in many respects, entirely similar to that of Fig. 1.

From the foregoing description, it can be readily appreciated that the invention provides a new and improved vacuum tube balancing network which is capable of automatically retaining its balance over extended periods of time despite such long range effects as aging of components, changes in temperature, existence of external fields and so forth, tending to throw the network out of balance. The network is designed in the manner such that it is capable of maintaining the balance despite the fact that the network is subjected to a large number of different types of conditions which tend to bring about an unbalance, and is capable of maintaining such balance in spite of varying degrees of severity of such unbalancing conditions. Additionally, the network is relatively simple in design, and requires fewer components than previous networks of the same general type. These factors allow the network to be constructed at a much cheaper cost than known balancing networks, and at the same time provides an entirely reliable apparatus.

Obviously, other modifications and variations of the present invention are possible in light of the above teachings. It is, therefore, to be understood that changes may be made herein which are within the full intended scope of the invention as defined by the appended claims.

What I claim as new and desire to secure by Letters Patent of the United States is:

1. A vacuum tube balancing network comprising a first bridge circuit having an impedance in each of the arms thereof, a resistor connected across a pair of diagonally opposite terminals of the bridge circuit, an electron discharge tube having a discharge path connected in parallel with at least a portion of the impedance in one arm of the bridge circuit for shunting the same, a second bridge circuit formed by two adjacent arms of said first bridge circuit and further comprising two additional adjacent arms each including an impedance, an electron discharge tube having a discharge path connected in parallel with at least a portion of the impedance in one of the additional arms, and a reactance connected across a pair of diagonally opposite terminals of said second bridge circuit, said reactance and said resistor being connected to a common terminal defined by the juncture of the impedances in the two adjacent bridge arms which are common to said first and second bridge circuits.

2. A vacuum tube balancing network comprising a first bridge circuit having an inductance in each of two adjacent arms thereof, a resistor connected between a bridge circuit terminal defined by the juncture of said inductances and the diagonally opposite terminal of the bridge circuit, a grid-controlled electron discharge tube having a discharge path connected in parallel with at least a portion of one of the non-inductive arms of the bridge circuit for shunting the same, a second bridge circuit formed by the two adjacent inductive arms of said first bridge circuit and further comprising two additional adjacent arms each including an impedance, a grid-controlled electron discharge tube having a discharge path connected in parallel with at least a portion of the impedance in one of the additional arms, and a capacitor connected across a pair of diagonally opposite terminals of said second bridge circuit including the terminal defined by the juncture of said inductances.

3. A vacuum tube balancing network comprising a first bridge circuit having a variable capacitance in each of two adjacent arms thereof, an impedance in each of the remaining two adjacent arms, a resistor connected across a pair of diagonally opposite terminals of the bridge circuit including the terminal defined by the juncture of the two adjacent arms having variable capacitances therein, a grid-controlled electron discharge tube having a discharge path connected in parallel with at least a portion of one of the non-inductive arms of the bridge circuit for shunting the same, a second bridge circuit formed by the two adjacent variable capacitance arms of said first bridge circuit and further comprising two additional adjacent arms each including an impedance, a grid-controlled electron discharge tube having a discharge path connected in parallel with at least a portion of the impedance in one of the additional arms, and an inductance connected across a pair of diagonally opposite terminals of said second bridge circuit including the terminal defined by the juncture of said two adjacent arms having variable capacitances therein.

4. A detecting system including in combination a double bridge vacuum tube balancing network comprising a first bridge circuit having a variable impedance in each of two adjacent arms thereof and a fixed impedance in each of the remaining arms thereof, a resistor connected across a pair of diagonally opposite terminals of the bridge circuit, one of said terminals being defined by the juncture of the two adjacent arms having variable impedances therein, a grid-controlled electron discharge tube having a discharge path connected in parallel with at least a portion of one of the fixed impedances of the bridge circuit for shunting the same, a second bridge circuit formed by the two adjacent variable impedance arms of said first bridge circuit and further comprising two additional fixed impedance arms, a grid-controlled electron discharge tube having a discharge path connected in parallel with at least a portion of the impedance in one of the additional arms, a reactance connected across a pair of diagonally opposite terminals of said second bridge circuit, means for introducing an alternating voltage into each of the two adjacent bridge arms having said variable impedances therein for energizing said double bridge balancing network, a phase sensitive detector having the input terminals thereof connected to receive the output of said double bridge network, an unbalance indicator coupled to the output of said phase sensitive detector, and a coupling circuit having a relatively long response time coupled to the output terminals of said phase sensitive detector and to the control grids of each of said grid-controlled electron discharge tubes.

5. A metal detecting system including in combination a double bridge vacuum tube balancing network comprising a first bridge circuit having an inductance in each of two adjacent arms thereof and a fixed impedance in each of the remaining arms thereof, a resistor connected across a pair of diagonally opposite terminals of the bridge circuit, one of said terminals being defined by the juncture of the two adjacent arms containing said inductances, a grid-controlled electron discharge tube having a discharge path connected in parallel with at least a portion of one of the fixed impedance arms of the bridge circuit for shunting the same, a second bridge circuit formed by the two adjacent inductive arms of said first bridge circuit and further comprising two additional fixed impedance arms, a grid-controlled electron discharge tube having a discharge path connected in parallel with at least a portion of the impedance in one of the additional arms, and a capacitor connected across a pair of diagonally opposite terminals of said second bridge circuit, one of said terminals being defined by the juncture of the two adjacent arms containing said inductances, a two-electrode gas discharge tube coupled to the plate electrodes of each of said grid-controlled electron discharge tubes and to a source of reference voltage, a third grid-controlled electron discharge device having the control grid thereof coupled to both of said gas discharge tubes, a relay having the exciting winding thereof coupled in the plate circuit of said third grid-controlled electron discharge tube, and means introducing an alternating voltage into each of the two adjacent bridge arms having said variable impedances therein for energizing said double bridge balancing network, a phase sensitive detector having the input terminals thereof connected to receive the output of said double bridge network, an unbalance indicator coupled to the output of said phase sensitive detector, and a coupling circuit having a relatively long response time coupled to the output terminals of said phase sensitive detector and to the control grids of each of said grid-controlled electron discharge tubes.

6. A vacuum tube balancing network comprising a first bridge circuit having variable impedances in each of two adjacent arms thereof and having preset resistors in each of the remaining two adjacent arms, a resistor connected between the terminal defined by the juncture of the variable impedances and the terminal defined by the juncture of the preset resistors, a grid-controlled electron discharge tube having a discharge path connected in parallel with at least a portion of the preset resistor in one arm of the bridge circuit for shunting the same, a second bridge circuit formed by the two adjacent variable impedance arms of said first bridge circuit and further including two additional adjacent arms each having a resistor connected therein, a grid-controlled electron discharge tube having a discharge path connected in parallel with at least a portion of the resistor in one of the additional arms, and a capacitor connected across said second bridge circuit between the terminal defined by the juncture of the variable impedances and the terminal defined by the juncture of the additional adjacent bridge arm resistors.

7. A vacuum tube balancing network comprising a first bridge circuit having an inductance in each of two adjacent arms thereof and having resistors in each of the remaining two adjacent arms, a resistor connected between the terminal defined by the juncture of said inductances and the terminal defined by the juncture of the bridge arm resistors, a grid-controlled electron discharge tube having a discharge path connected in parallel with at least a portion of the resistor in one arm of the bridge circuit for shunting the same, a second bridge circuit formed by the adjacent inductance arms of said first bridge circuit and further including two additional adjacent arms each having a resistor connected therein, a grid-controlled electron discharge tube having a discharge path connected in parallel with at least a portion of the resistor in one of the additional arms, a capacitor connected across said second bridge circuit between the terminal defined by the juncture of the inductances and the terminal defined by the juncture of the additional adjacent bridge arm resistors.

8. A vacuum tube balancing network comprising a first bridge circuit having a variable capacitance in each of two adjacent arms thereof and having resistors in each of the remaining two adjacent arms, a resistor connected between the terminal defined by the juncture of said capacitance arms and the terminal defined by the juncture of said bridge arm resistors, a grid-controlled electron discharge tube having a discharge path connected in parallel with at least a portion of the resistor in one arm of the bridge circuit for shunting the same, a second bridge circuit formed by the adjacent capacitance arms of said first bridge circuit and further including two additional adjacent arms each having a resistor connected therein, a grid-controlled electron discharge tube having a discharge path connected in parallel with at least a portion of the resistor in one of the additional arms, a capacitor connected across said second bridge circuit between the terminal intermediate the inductances and the terminal intermediate the additional adjacent bridge arm resistors.

9. A detecting system including in combination a double bridge vacuum tube balancing network comprising a first bridge circuit having a variable impedance in each of two adjacent arms thereof and having preset resistors in each of the remaining two adjacent arms, a third resistor connected between the terminal defined by the juncture of the variable impedances and the terminal defined by the juncture of the preset resistors, a grid-controlled electron discharge tube having a discharge path connected in parallel with at least a portion of the preset resistor in one arm of the bridge circuit for shunting the same, a second bridge circuit formed by the two adjacent variable impedance arms of said first bridge circuit and further including two additional adjacent arms each having a resistor connected therein, a grid-controlled electron discharge tube having a discharge path connected in parallel with at least a portion of the resistor in one of the additional arms, a capacitor connected between the terminal defined by the juncture of the variable impedances and the terminal defined by the juncture of the additional adjacent bridge arm resistors, means introducing an alternating voltage into each of the two adjacent bridge arms having said variable impedances therein for energizing said double bridge balancing network, a phase sensitive detector having the input thereof connected to receive the output of said double bridge network, an unbalance indicator coupled to the output of said phase sensitive detector, and a coupling circuit having a relatively long response time coupled to the output of said phase sensitive detector and to the control grids of each of said grid-controlled electron discharge tubes.

10. A detecting system including in combination a double bridge vacuum tube balancing network comprising a first bridge circuit having an inductance in each of two adjacent arms thereof and having resistors in each of the remaining two adjacent arms, a resistor connected between the terminal defined by the juncture of said inductances and the terminal defined by the juncture of said bridge arm resistors, a grid-controlled electron discharge tube having a discharge path connected in parallel with at least a portion of the resistor in one arm of the bridge circuit for shunting the same, a second bridge circuit formed by the two adjacent inductance arms of said first bridge circuit and further including two additional adjacent arms each having a resistor connected therein, a grid-controlled electron discharge tube having a discharge path connected in parallel with at least a portion of the resistor in one of the additional arms, a capacitor connected across said second bridge circuit between the terminal defined by the juncture of the inductance arms and the terminal defined by the juncture of the additional adjacent bridge arm resistors, a two-electrode gas discharge tube coupled to the plate electrodes of each of said grid-controlled electron discharge tubes and to a source of reference voltage, a third grid-controlled electron discharge device having the control grid thereof coupled to both of said gas discharge tubes, an alarm relay having the exciting winding thereof coupled in the plate circuit of said third grid-controlled electron discharge tube, and means introducing an alternating voltage into each of the two adjacent bridge arms having said variable impedances therein for energizing said double bridge balancing network, a phase sensitive detector having the input thereof connected to receive the output of said double bridge network, an unbalance indicator coupled to the output of said phase sensitive detector, and a coupling circuit having a relatively long response time coupled to the output of said phase sensitive detector and to the control grids of each of said grid-controlled electron discharge tubes.

References Cited in the file of this patent

UNITED STATES PATENTS 2,489,920  Michel ---------------- Nov. 29, 1949